United States Patent [19]
Kazino et al.

[11] Patent Number: 5,174,704
[45] Date of Patent: Dec. 29, 1992

[54] BOLT HEAD AND SOCKET FOR THE SAME

[75] Inventors: Hiroshi Kazino, Komaki; Junzo Ozawa, Bisai, both of Japan

[73] Assignee: K.K. Aoyama Seisakusho, Nagoya, Japan

[21] Appl. No.: 748,766

[22] Filed: Aug. 23, 1991

[30] Foreign Application Priority Data

Aug. 23, 1990 [JP] Japan .......................... 2-88633[U]

[51] Int. Cl.$^5$ ...................... F16B 23/00; F16B 35/06
[52] U.S. Cl. .................... 411/403; 411/919; 81/121.1
[58] Field of Search ............ 411/402, 403, 407, 410, 411/919; 81/121.1, 186, 436

[56] References Cited

U.S. PATENT DOCUMENTS

| | | | |
|---|---|---|---|
| 3,903,764 | 9/1975 | Anderson | 81/121.1 |
| 3,908,488 | 9/1975 | Anderson | 81/121.1 |
| 4,512,220 | 4/1985 | Barnhill, III et al. | 81/121.1 |
| 4,646,594 | 3/1987 | Tien | 81/121.1 |
| 4,765,211 | 8/1988 | Colvin | 81/121.1 |
| 4,882,957 | 11/1989 | Wright et al. | 81/121.1 |
| 4,930,378 | 6/1990 | Colvin | 81/121.1 |
| 5,012,706 | 5/1991 | Wright et al. | 81/121.1 |
| 5,020,954 | 6/1991 | Dreger | 411/403 |

FOREIGN PATENT DOCUMENTS 2443719  1/1976  Fed. Rep. of Germany ...... 411/402

Primary Examiner—Neill R. Wilson
Attorney, Agent, or Firm—Cushman, Darby & Cushman

[57] ABSTRACT

A hexagon head bolt having a head with an incline formed on each of the outer faces thereof so as to be inwardly inclined toward a respective corner of each face. Thus the head of the bolt can easily be engaged with the socket of an impact wrench or the like, without damage of the corners of the bolt. In another embodiment, a hexagon socket is provided having an incline formed on each of the outer faces thereof so as to be outwardly inclined toward a respective corner of each face.

4 Claims, 5 Drawing Sheets

BOLT HEAD AND SOCKET FOR THE SAME

BACKGROUND OF THE INVENTION

1. Field of the Invention

The present invention relates to a novel bolt and socket which are designed so that they can be accurately tightened by, for example, an impact wrench.

2. Description of Related Art

Since a conventional hexagon head bolt has a hexagon head, when the hexagon bolt is tightened by an impact wrench, a socket hole 3 is rotated an angle $\theta$ with respect to a bolt head 1 due to a clearance between the socket hole 3 of the impact wrench and the bolt head 3, as shown by arrows in FIG. 4. The corner portions 2 of the bolt head 1 are respectively inevitably brought into point contact with the inner sides 4 of the socket hole 3. The conventional bolt thus has the fault that this point contact causes damage to the bolt head 1 and thus leads to rusting of the bolt head 1. In the case of a M-6 bolt, the minimum shift angle $\theta$ is about $0°\ 14'$, and the maximum shift angle $\theta$ is about $4°\ 13'$. These angles are measured with respect to the clearance between the socket hole 3 and the bolt head 1. However, since the clearance between both members is generally actually set to a rather large value in order to facilitate the engagement between the socket hole 3 and the bolt head 1, the shift angle $\theta$ is generally still larger.

SUMMARY OF THE INVENTION

The present invention has been achieved with the objective solving the above problem of conventional bolts. It is therefore an object of the present invention to provide a socket and a bolt in which the bolt head easily engages the socket hole of an impact wrench or the like, and which can prevent the corners of the bolt head from being damaged by point contact of the bolt head.

To this end, the present invention provides a hexagon head bolt having a head in which each face of the bolt head is inclined toward the corners of each respective face of the head.

The present invention also provides a socket in which each face of the socket is outwardly inclined toward the corners of each respective face of the hexagon socket.

DETAILED DESCRIPTION OF PREFERRED EMBODIMENTS

Figure 1:
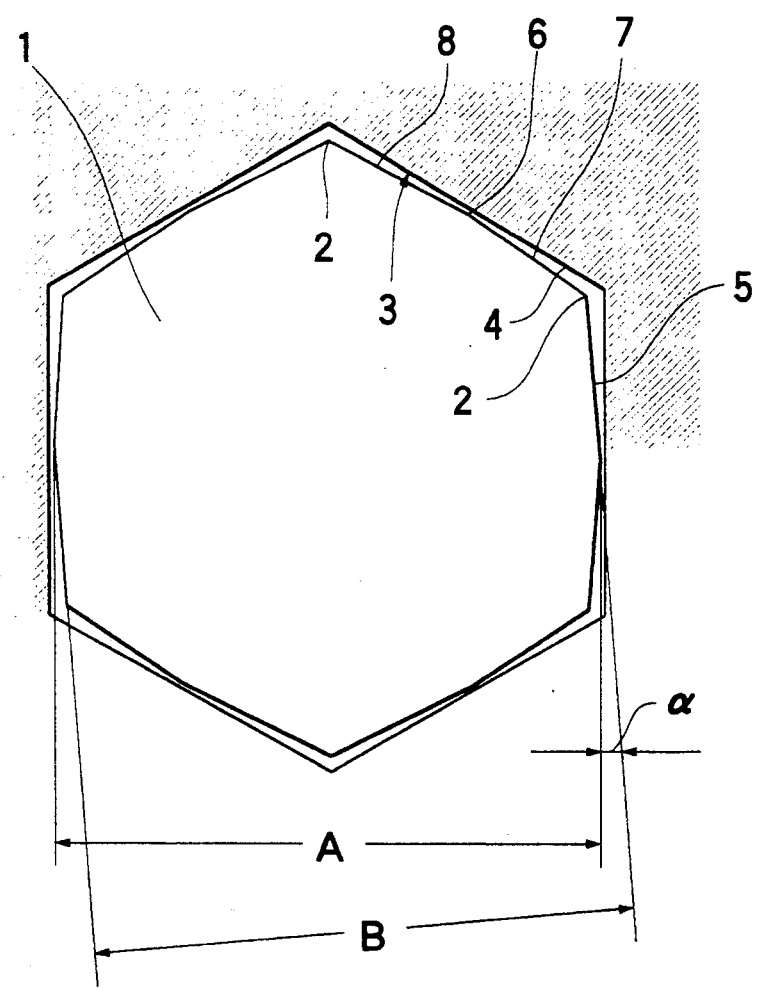
FIG. 1 is a plan view of a bolt in accordance with an embodiment of the present invention.

The present invention is described in detail below with reference to the embodiments shown in the drawings.

FIG. 1 shows a bolt according to an embodiment of the present invention in which reference numeral 1 denotes the head of a hexagon head bolt, and reference numeral 5 denotes each the six outer sides or faces thereof. As shown in the drawing, inclines 7, 8 are formed in each of the face 5 so as to be inclined at an angle $\alpha$ and extended from the center 6 of each of the outer sides 5 toward the corner portions 2 at both ends of each side 5. This angle $\alpha$ represents the angle of each of the inclines 7 with respect to the corresponding inner face of a socket 3 when the corner portions 2 of the head 1 of the hexagon head bolt are respectively fitted to the corner portions of the socket hole 3. In this embodiment, the angle $\alpha$ is set to $2°\ 5'30''$. In this embodiment, the distance A between the centers 6 of the two opposite outer faces 5 is set to the maximum of standard values for bolt heads, and the distance B between the inclines 7 of the two opposite outer faces 5 is set to a value sufficiently smaller than the distance A of the bolt head 1.

Figure 2:
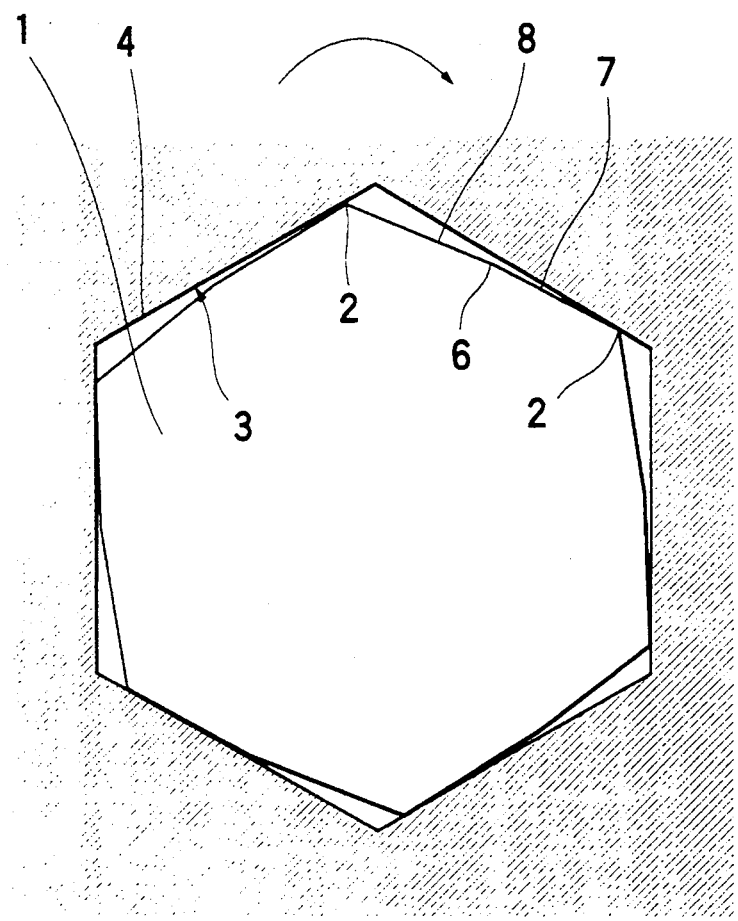
FIG. 2 is a plan view of the same bolt when torque is applied.

In the bolt of the present invention configured as described above, because the distance B is sufficiently smaller than the inside diameter of the socket hole 3, the bolt can be easily engaged with the socket hole 3 of an impact wrench or the like. When torque is transmitted, a deviation occurs between the bolt head 1 and the socket hole 3, as shown in FIG. 2. However, since the inclines 7 of the bolt head 1 respectively engage the inner sides 4 of the socket hole 3, the corner portions 2 of the bolt head 1 of the bolt of the present invention do not strongly contact with the inner sides 4 of the socket hole 3 even during tightening by using an impact wrench, as conventional bolts. It is thus possible to prevent the damage to the corner portions 2.

As in the embodiment of the present invention, if the inclines 7, 8 are symmetrically formed, the same effect is exhibited either during tightening or loosening, i.e., when the torque if reversed. However, the inclines 7, 8 need not to be formed symmetrically with respect to the center of each of the outer faces 5, and only the incline 7 may be provided in any desired portion of each of the outer faces 5 in order to be effective during tightening only, for example.

Although a usual socket having the hexagon socket 3 can be used for the bolt of the present invention, conversely the form of the socket 3 may be changed, according to the present invention, while a usual hexagon head bolt is used.

Figure 3:
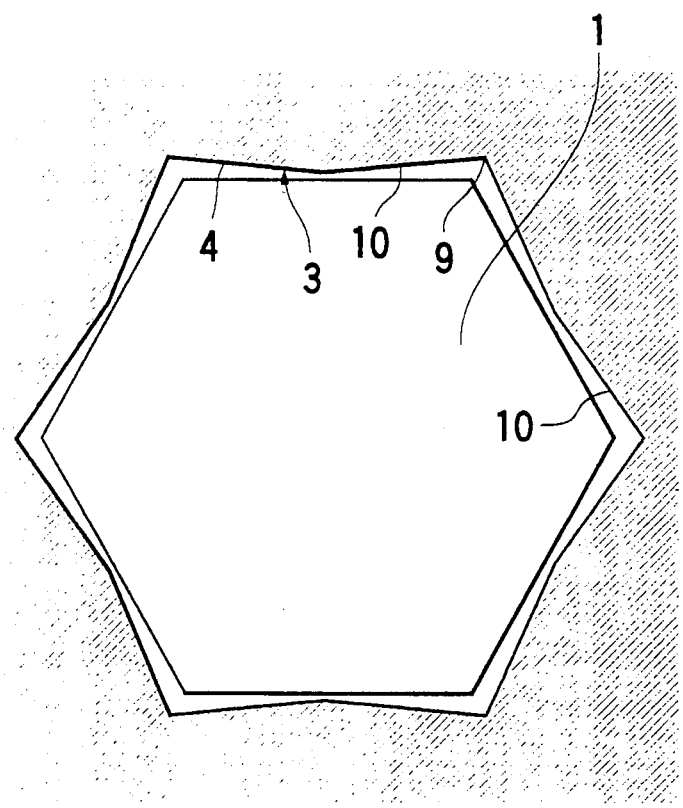
FIG. 3 is a plan view of a socket in accordance with an embodiment of the present invention.
Figure 4:
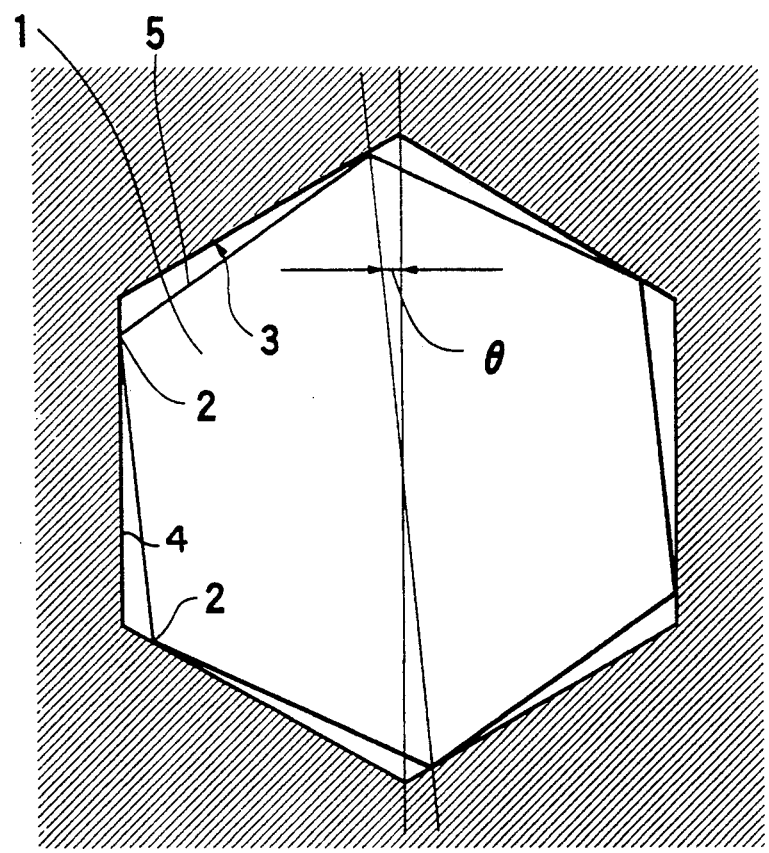
FIG. 4 is a plan view of a conventional bolt.

FIG. 3 shows a socket in accordance with an embodiment of the present invention which is designed as described above. An incline 10 outwardly inclined toward each of corner portions 9 on the tightening side is formed on each of the inner faces 4 of the socket 3. In this case, the angles of each of the incline planes 10 and the dimensions of each portion of the socket of the bolt of the first embodiment of the invention. Since the operation and effect are also the same as those of the first embodiment invention, they are not described below.

Figure 5:
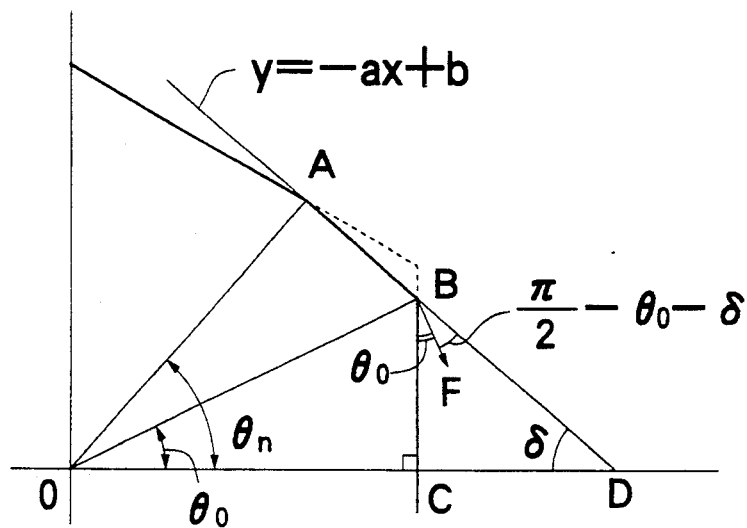
FIGS. 5 and 6 are drawings for explaining the theoretical basis of the present invention.
Figure 6:
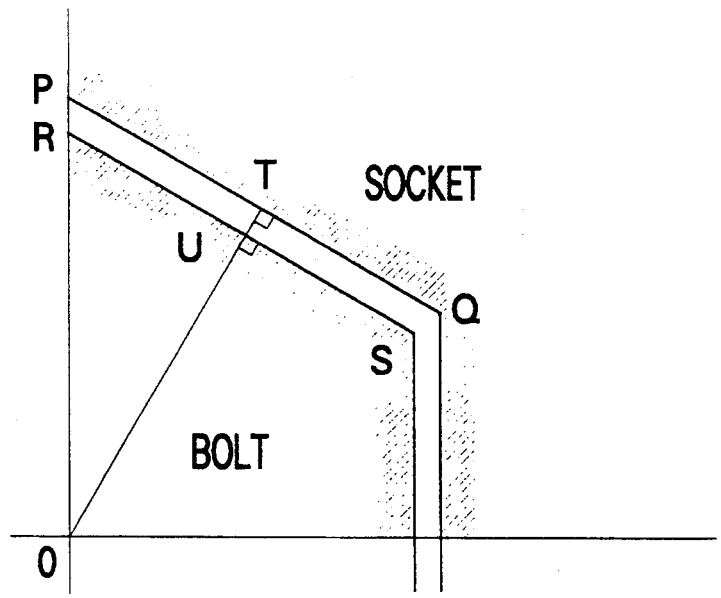

The theoretical basis of the present invention is described below with reference to FIGS. 5 and 6.

Assuming that when the hexagon head bolt of the present invention is tightened by a socket, a force is received by a surface AB which corresponds to each of the inclines 7, since the force is simultaneously received by the surface AB, uniform force acts on every point on the surface AB. It is assumed that the force is F, the straight line along the surface AB is $y = -ax + b$, the angle formed by the straight line and the x axis is $\delta$, and the angles formed by the x axis and segments OA and OB are $\theta n$ and $\theta o$ respectively. In this case, the angle $\theta o$ is within the range of $0 < \theta o < \pi/6$.

The range of the angle $\theta n$ is described with reference to FIG. 6. When the socket is clockwise rotated, every point on a surface PQ revolves at a constant distance from a point O. When the point T, at the shortest distance from the point O, revolves to a point on a surface RS, the point T is closest to a point U. This point is placed on a surface US and on the left side of the points on the surface RS to which any points on the surface PQ other than the point T are moved. The angle $\theta n$ is therefore within the range of $\pi/6 < \theta n < \pi/3$.

A description will now be given of the forces horizontal and vertical to the surface AB at any desired point between A and B. For example, since $\angle BOC = \theta o$ and $OB \perp \vec{F}$, the angle formed by BC and $\vec{F}$ is $\theta o$. In addition, since $\angle BDC = \delta$, the angle formed by BD and F is $\pi/2 - \theta o - \delta$.

In this way, since the horizontal force at any desired point between A and B is F cos $(\pi/2 - \theta - \delta)$, and the vertical force is F sin $(\pi/2 - \theta - \delta)$, each of the forces can be expressed as a function of $\theta$.

The sums of the horizontal force and vertical force between A and B are constant regardless of the values of the angles $\theta o$ and $\theta n$. The values of the sums are the following:

The sum of the horizontal force is as follows:

$$\begin{aligned}\int_{\theta o}^{\theta n} F\cos(\pi/2 - \theta - \delta)d\theta &= F\int_{\theta o}^{\theta n} \sin(\theta + \delta)d\theta \\ &= F\{-\cos(\theta + \delta)\}\Big|_{\theta o}^{\theta n} \\ &= F\{\cos(\theta o + \delta) - \cos(\theta n + \delta)\}\end{aligned}$$

The sum of the vertical force is as follows:

$$\begin{aligned}\int_{\theta o}^{\theta n} F\sin(\pi/2 - \theta - \delta)d\theta &= F\int_{\theta o}^{\theta 1} \cos(\theta + \delta)d\theta \\ &= F\{\sin(\theta + \delta)\}\Big|_{\theta o}^{\theta n} \\ &= F\{\sin(\theta o + \delta) - \sin(\theta n + \delta)\}\end{aligned}$$

In a conventional hexagon head bolt, since the angles $\theta n$ and $\theta o$ are close to each other, the following equation is obtained:

$$\lim_{\theta n \to \theta o} F\{\cos(\theta o + \delta) - \cos(\theta n + \delta)\}$$

Since $\lim F \{\cos(\theta o + \delta) - \cos(\theta n + \delta)\} = 0$, $$\lim_{\theta n \to \theta o} F = \infty$$

Similarly, the following equations are obtained:

$$\lim_{\theta n \to \theta o} F \{\sin(\theta n + \delta) - \sin(\theta o + \delta)\}$$

$\lim F \{\sin(\theta n + \delta) - \sin(\theta o + \delta)\} = 0$, $$\lim_{\theta n \to \theta o} F = \infty$$

In this way, the hexagon head of a conventional bolt having a shape in which the angle $\theta n$ and $\theta o$ are close to each other is subjected to a great force in the diagonal direction.

On the other hand, since the bolt of the present invention has a shape in which force is received by the surface AB, i.e., the angles $\theta n$ and $\theta o$ are different from each other, the bolt is subjected to small force at every point thereof, as compared with the conventional bolt. The bolt of the present invention is thus difficult to deform and rust and has high corrosion resistance.

As seen from the above description, the bolt and socket of the present invention allow the bolt head to be easily engaged with the socket and prevent the corner portions of the bolt head from locally contacting the inner faces of the socket when torque is applied. It is thus possible to prevent the damage to the bolt and rust caused by the damage. In addition, since the present invention enables the hexagonal shape of the bolt head to be changed to a dodecagonal shape which is close to a circle, the overhang of the corner portions of the bolt head can be improved during the production process, and transmittance of torque can be improved during tightening.

Although the present invention is particularly effective if the bolt is tightened by an impact wrench, the present invention is not limited to this case.

As described above, the present invention provides a bolt and socket which have none of the problems of conventional bolts, and the invention is thus of much practical use.

While the invention has been described with respect to several preferred embodiments, one of ordinary skill in the out will recognize that improvements and modifications can be made while remarking within the scope and spirit of the present invention. The scope of the invention is determined solely by the appended claims.

What is claimed is:

1. A hexagonal bolt head, comprising:
   a head having six outer side faces;
   wherein each of the side faces consists of two inclines; and
   wherein each of said inclines extends from a center of one of the six side faces to a corner where one side face joins another.

2. A bolt head according to claim 1, wherein each of said inclines are at an angle of 2° 5'30" with respect to the side face that said inclines divide.

3. A hexagonal socket, comprising:
   a socket having six inner side faces;
   wherein each of the side faces consists of two inclines; and
   wherein each of said inclines extends from a center of one of the six side faces to a corner where one side face joins another.

4. A hexagonal socket according to claim 3, wherein each of said inclines are at an angle of 2° 5'30" with respect to the side face that said inclines divide.

* * * * *